(12) United States Patent
Mitsuyama et al.

(10) Patent No.: US 8,949,007 B2
(45) Date of Patent: Feb. 3, 2015

(54) START-UP POSSIBILITY DETERMINING APPARATUS AND START-UP POSSIBILITY DETERMINING METHOD

(71) Applicants: Furukawa Electric Co., Ltd., Tokyo (JP); Furukawa Automotive Systems Inc., Shiga (JP)

(72) Inventors: Taiji Mitsuyama, Tokyo (JP); Etsuzo Sato, Shiga (JP)

(73) Assignees: Furukawa Electric Co., Ltd., Tokyo (JP); Furukawa Automotive Systems Inc., Shiga (JP)

( * ) Notice: Subject to any disclaimer, the term of this patent is extended or adjusted under 35 U.S.C. 154(b) by 22 days.

(21) Appl. No.: 13/957,681

(22) Filed: Aug. 2, 2013

(65) Prior Publication Data

US 2013/0317729 A1 Nov. 28, 2013

Related U.S. Application Data

(63) Continuation of application No. PCT/JP2012/055760, filed on Mar. 7, 2012.

(30) Foreign Application Priority Data

Mar. 7, 2011 (JP) .................................. 2011-049343

(51) Int. Cl.
 *F02D 35/00* (2006.01)
 *B60R 16/03* (2006.01)

(52) U.S. Cl.
 CPC ............... *F02D 35/00* (2013.01); *B60R 16/03* (2013.01)
 USPC .......................... 701/113; 701/105; 123/179.4

(58) Field of Classification Search
 CPC ....... F02D 29/02; F02D 41/22; F02D 41/062; F02D 41/042; F02D 41/2467; F02D 41/1405; F02D 45/00; B60W 10/06; B60W 10/08; F02N 11/0814

USPC .......................... 701/102, 106, 110, 112–115; 123/179.1, 179.3, 179.4, 179.28
See application file for complete search history.

(56) References Cited

U.S. PATENT DOCUMENTS

2009/0051364 A1* 2/2009 Ishida et al. .................. 324/430
2010/0269776 A1* 10/2010 Mizuno ...................... 123/179.4

FOREIGN PATENT DOCUMENTS

JP 2007-269051 A 10/2007
JP 2008-307973 A 12/2008
(Continued)

OTHER PUBLICATIONS

International Search Report for PCT/JP2012/055760 dated Jun. 12, 2012 (English Translation).
(Continued)

*Primary Examiner* — John Kwon
*Assistant Examiner* — Johnny H Hoang
(74) *Attorney, Agent, or Firm* — Thompson Coburn LLP; Alan H. Norman

(57) ABSTRACT

A start-up possibility determining apparatus that determines an engine-start-up possibility by driving a starter motor by power accumulated in a secondary battery includes a dynamic internal resistance measuring unit that measures an internal resistance of the secondary battery while the engine is being started up by the starter motor, a static internal resistance measuring unit that measures an internal resistance of the secondary battery when the engine is stopped, and a determining unit that determines an engine start-up possibility by the secondary battery, based on a value obtained by a product of a ratio between a first static internal resistance before or after the past engine start-up and a second static internal resistance within a predetermined time since a current time point and the dynamic internal resistance measured by the dynamic internal resistance measuring unit at the time of the engine start-up in the past.

10 Claims, 14 Drawing Sheets

(56) References Cited

FOREIGN PATENT DOCUMENTS

| JP | 2009-047093 A | 3/2009 |
|---|---|---|
| JP | 2009-241633 A | 10/2009 |
| JP | 2009-241663 A | 10/2009 |
| JP | 2009-244179 A | 10/2009 |

OTHER PUBLICATIONS

International Search Report for PCT/JP2012/055760 dated Jun. 12, 2012.
Decision to Grant for JP 2011-049343 dated Jun. 11, 2013.

* cited by examiner

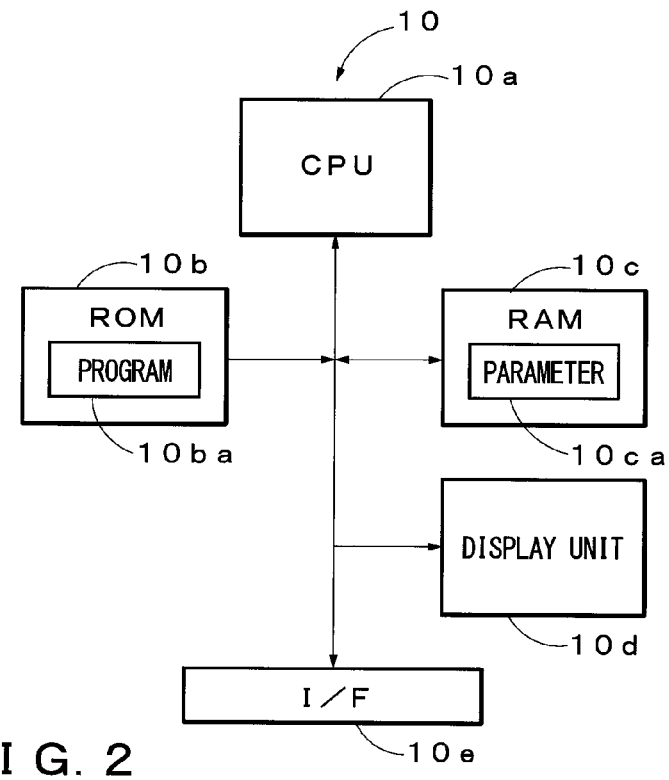
F I G. 2
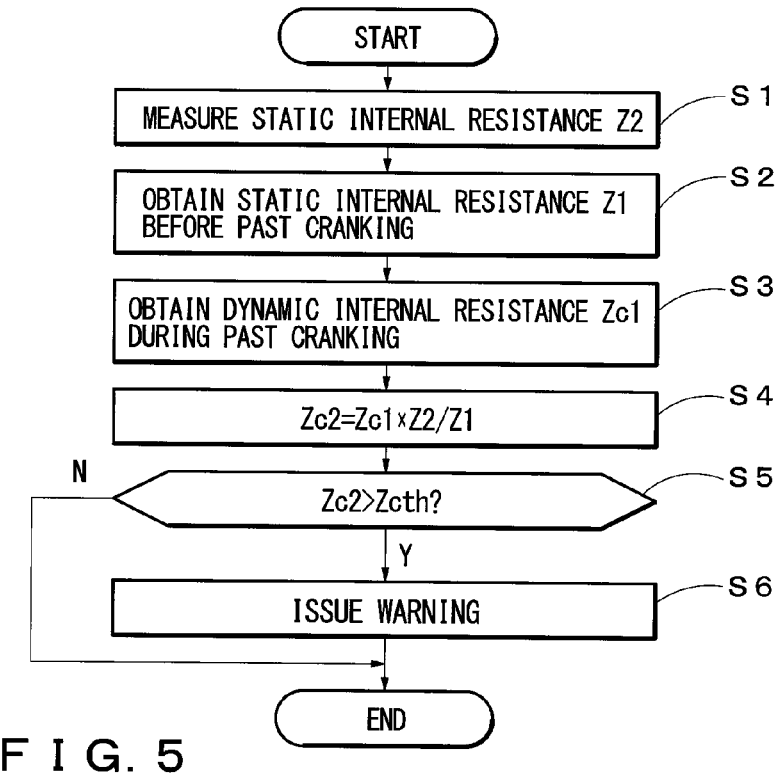
F I G. 5

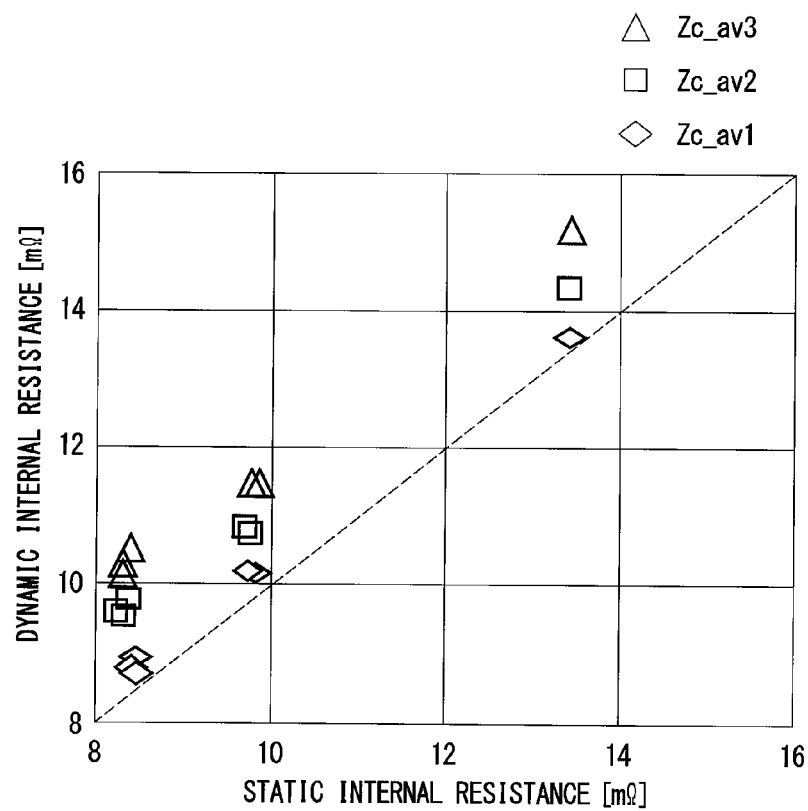
F I G. 3
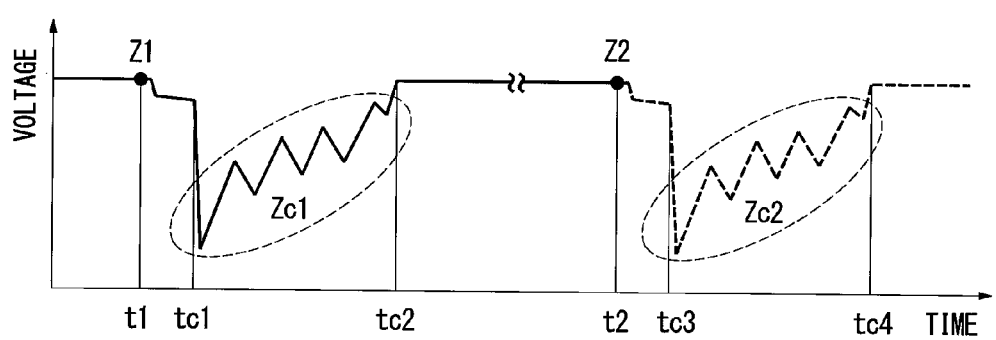
F I G. 4

START-UP POSSIBILITY DETERMINING APPARATUS AND START-UP POSSIBILITY DETERMINING METHOD

CROSS REFERENCE TO RELATED APPLICATIONS

This is a continuation application of International Patent Application No. PCT/JP2012/055760 filed Mar. 7, 2012, which claims the benefit of Japanese Patent Application No. 2011-049343, filed Mar. 7, 2011, the full content of which is hereby incorporated by reference in its entirety.

BACKGROUND

1. Technical Field

The present invention relates to a start-up possibility determining apparatus and a start-up possibility determining method.

2. Background Art

In automobiles or the like in which an engine is started up by driving a starter motor by electric power accumulated in a secondary battery, it is very important to know whether the engine can be started up next time at the time the engine is stopped or after the engine has stopped.

Japanese Laid-Open Patent Publication No. 2009-47093 discloses a technique in which a voltage of a secondary battery when driving a starter motor is measured, a leading minimum value is obtained, a square value of the leading minimum value is calculated, and in a case where the square value is greater than or equal to a predetermined value, it is determined that it is possible to start up the engine.

With the technique disclosed in Japanese Laid-Open Patent Publication No. 2009-47093, since the determination is carried out at the time the engine is started up, in a case where time has elapsed since the engine start-up, there is a problem that the determination may not be effective since, for example, situation has changed due to a change in environment such as the temperature and a self-discharging of the secondary battery.

Thus, it is an object of the present disclosure to provide a start-up possibility determining apparatus and a start-up possibility determining method that can determine the possibility of an engine start-up accurately, even in a case where a predetermined time has elapsed since an engine start-up in the past.

SUMMARY

In order to achieve the above object, a start-up possibility determining apparatus that determines whether an engine can be started up by driving a starter motor by electric power accumulated in a secondary battery, includes a dynamic internal resistance measuring unit that measures a dynamic internal resistance which is an internal resistance of the secondary battery while the engine is being started up by the starter motor, a static internal resistance measuring unit that measures a static internal resistance which is an internal resistance of the secondary battery when the engine is stopped, and a determining unit that determines possibility of a start-up of the engine by the secondary battery, based on a value obtained by a product of a ratio between a first static internal resistance which was measured by the static internal resistance measuring unit before or after a time of an engine start-up in the past and a second static internal resistance which was measured by the static internal resistance measuring unit within a predetermined time since a current point of time and the dynamic internal resistance measured by the dynamic internal resistance measuring unit at the time of engine start-up in the past.

With such a configuration, even if a predetermined time has elapsed since an engine start-up in the past, an engine start-up possibility can be determined accurately.

In addition to the above configuration, the dynamic internal resistance measuring unit measures the dynamic internal resistance based on a voltage and an electric current of the secondary battery while the engine is being started-up by the starter motor, and the static internal resistance measuring unit measures the static internal resistance based on a voltage and an electric current when the secondary battery is caused to intermittently discharge electricity.

With such a configuration, a dynamic internal resistance and a static internal resistance can be determined accurately.

In addition to the aforementioned configuration, the dynamic internal resistance measuring unit measures the dynamic internal resistance after a predetermined time has elapsed since a start of rotation of the starter motor.

With such a configuration, the start-up possibility of the engine can be determined with a higher accuracy.

In addition to the aforementioned configuration, the determination unit determines the possibility of the start-up of the engine based on a value obtained by correcting values of the dynamic internal resistance and the first static internal resistance in accordance with a temperature at a time of measurement by the dynamic internal resistance measuring unit and the static internal resistance measuring unit.

With such a configuration, an influence of the temperature can be reduced and the start-up possibility can be determined accurately.

In addition to the aforementioned configuration, the determination unit estimates a voltage and an electric current of the secondary battery at the time of the start-up of the engine based on a value obtained by a product of a ratio between the first and second static internal resistances and the dynamic internal resistance, and determines that the start-up of the engine is possible in a case where one of the estimated voltage and the estimated electric current is greater than the predetermined threshold.

With such a configuration, the start-up possibility can be determined accurately and easily by a relationship between an electric current and a threshold or between a voltage and a threshold.

In addition to the aforementioned configuration, the determination unit determines that the start-up is possible when a voltage prediction value V2 of the secondary battery at a time of an engine start-up, which is expressed by the following equation, is greater than a predetermined threshold, $$V2 = Vb2 - I1 \cdot Zc1 \frac{Z2}{Z1}$$

where,

Vb2 is a voltage of the secondary battery before an engine start-up or a stable open circuit voltage;

I1 is an electric current flowing to the secondary battery at the time of the engine start-up in the past;

Zc1 is the dynamic internal resistance; and

Z1 and Z2 are the first and the second static internal resistances, respectively.

With such a configuration, the voltage at the time the engine is started up is estimated and the start-up possibility can be determined accurately based on the estimated voltage.

In addition to the aforementioned configuration, the determination unit determines that the start-up is possible when a voltage prediction value V2 of the secondary battery at a time of an engine start-up, which is expressed by the following equation, is greater than a predetermined threshold, $$V2 = Vb2 - \alpha \cdot I1 \cdot \beta \cdot Zc1 \frac{\eta \cdot Z2}{\gamma \cdot Z1}$$

where,

Vb2 is a voltage of the secondary battery before an engine start-up or a stable open circuit voltage;

I1 is an electric current flowing to the secondary battery at the time of the engine start-up in the past;

Zc1 is the dynamic internal resistance;

Z1 and Z2 are the first and the second static internal resistances, respectively; and α, β, γ and η are temperature correction coefficients.

With such a configuration, the voltage at the time the engine is started up is estimated without depending on a temperature change and the start-up possibility can be determined accurately based on the estimated voltage.

In addition to the aforementioned embodiment, the determination unit determines that the start-up is possible when a voltage prediction value V2 of the secondary battery at a time of an engine start-up, which is expressed by the following equation, is greater than a predetermined threshold, $$V2 = Vb2 - Iset \cdot Zc1 \frac{Z2}{Z1}$$

where,

Vb2 is a voltage of the secondary battery before an engine start-up or a stable open circuit voltage;

Iset is a predetermined electric current which is determined in advance;

Zc1 is the dynamic internal resistance; and

Z1 and Z2 are the first and the second static internal resistances, respectively.

With such a configuration, the voltage at the time the engine is started is estimated and the start-up possibility can be determined accurately based on the estimated voltage.

In addition to the aforementioned configuration, the determination unit determines that the start-up is possible when a voltage prediction value V2 of the secondary battery at a time of an engine start-up, which is expressed by the following equation, is greater than a predetermined threshold, $$V2 = Vb2 - \alpha \cdot Iset \cdot \beta \cdot Zc1 \frac{\eta \cdot Z2}{\gamma \cdot Z1}$$

where,

Vb2 is a voltage of the secondary battery before an engine start-up or a stable open circuit voltage;

Iset is a predetermined electric current which is determined in advance;

Zc1 is the dynamic internal resistance;

Z1 and Z2 are the first and the second static internal resistances, respectively; and α, β, γ and η are temperature correction coefficients.

With such a configuration, the voltage at the time the engine is started up is estimated without depending on a temperature change and the start-up possibility can be determined accurately based on the estimated voltage.

A start-up possibility determining method of determining whether an engine can be started up by driving a starter motor by electric power accumulated in a secondary battery includes measuring a dynamic internal resistance which is an internal resistance of the secondary battery while the engine is being started up by the starter motor, measuring a static internal resistance which is an internal resistance of the secondary battery when the engine is stopped, and determining possibility of a start-up of the engine by the secondary battery, based on a value obtained by a product of a ratio between a first static internal resistance which was measured by the static internal resistance measuring unit before or after a time of an engine start-up in the past and a second static internal resistance which was measured by the static internal resistance measuring unit within a predetermined time since a current point of time and the dynamic internal resistance measured by the dynamic internal resistance measuring unit at the time of the engine start-up in the past.

With such a method, even if a predetermined time has elapsed since an engine start-up in the past, an engine start-up possibility can be determined accurately.

According to the invention, a start-up possibility determining apparatus and a start-up possibility determining method can be provided that can determine an engine start-up possibility accurately even in a case where a predetermined time has elapsed since an engine start-up in the past.

BRIEF DESCRIPTION OF DRAWINGS

FIG. 1 is a diagram illustrating a configuration example of a start-up possibility determining apparatus of an embodiment of the present invention.

[FIG. 2] FIG. 2 is a block diagram illustrating a detailed configuration example of a control unit of FIG. 1.

[FIG. 3] FIG. 3 is a diagram for explaining an operation principle of the embodiment of the present disclosure.

[FIG. 4] FIG. 4 is a diagram for explaining an operation principle of the embodiment of the present disclosure.

[FIG. 5] FIG. 5 is a flowchart for explaining an operation principle of the embodiment of the present disclosure.

FIG. 6 is a diagram showing a relationship between a vehicle state and an electric current and a voltage of the secondary battery.

FIG. 7 is a flow chart for explaining a process of obtaining a static internal resistance.

FIG. 8 is a flow chart for explaining a process of obtaining a dynamic internal resistance.

FIG. 9 is a diagram illustrating a temporal change in an electric current of the secondary battery during cranking.

FIG. 10 is a flow chart for the determination of the engine start-up possibility.

FIG. 11 is a diagram showing a temporal change in a voltage of the secondary battery during cranking.

[FIG. 12]

[FIG. 13]

[FIG. 14]

FIG. 15 is a diagram showing a result of voltage estimation 0.2 seconds after the cranking start detection.

FIG. 16 is a diagram showing a result of voltage estimation 0.4 seconds after the cranking start detection.

FIG. 17 is a diagram showing a result of voltage estimation 0.6 seconds after the cranking start detection.

DETAILED DESCRIPTION

Hereinafter, embodiments of the present invention will be described.

(A) Description of Configuration of the Embodiment

Figure 1:
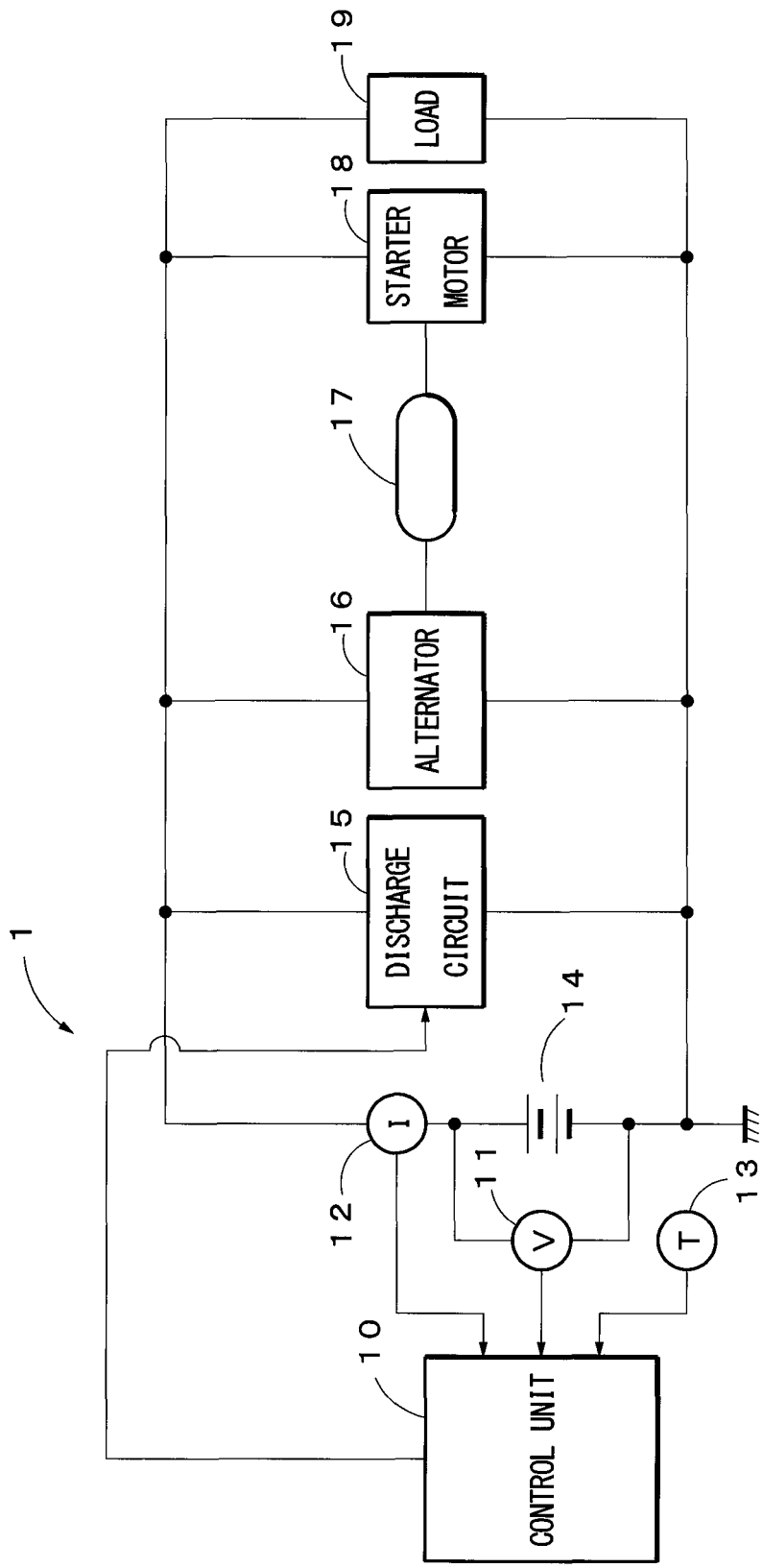
[FIG. 1]

FIG. 1 is a diagram illustrating a power supply system of a vehicle having a start-up possibility determining apparatus of an embodiment of the present disclosure. In this diagram, a start-up possibility determining apparatus 1 includes, as its main constituent elements, a control unit 10, a voltage sensor 11, a current sensor 12 and a temperature sensor 13, and carries out a determination of whether or not it is possible to start up an engine 17 by driving a starter motor 18 by a secondary battery 14. Here, the control unit 10 carries out a determination of whether the engine 17 can be started up by the secondary battery 14, based on outputs from the voltage sensor 11, the current sensor 12 and the temperature sensor 13. The voltage sensor 11 detects a terminal voltage of the secondary battery 14 and informs the control unit 10 of the terminal voltage. The current sensor 12 detects an electric current flowing to the secondary battery 14 and informs the control unit 10 of the current. The temperature sensor 13 detects the temperature of the secondary battery 14 itself or a surrounding environmental temperature and informs the control unit 10 of the temperature. A discharge circuit 15 includes, for example, a semiconductor switch, a resistive element, etc., that are connected in series, and by performing an ON/OFF control of the semiconductor switch by the control unit 10, the secondary battery 14 is caused to discharge intermittently.

The secondary battery 14 is, for example, a lead-acid battery, a nickel cadmium battery, a nickel metal hydride battery or a lithium-ion battery. The secondary battery 14 is charged by the alternator 16, starts up the engine by driving the starter motor 18 and supplies power to a load 19. The alternator 16 is driven by the engine 17 and generates alternating-current electric power, which is converted into direct-current electric power by a rectifying circuit, and charges the secondary battery 14.

The engine 17 is constituted by, for example, a reciprocating engine such as a gasoline engine and a diesel engine, a rotary engine or the like. The engine 17 is started up by the starter motor 18, applies a propulsion force to the vehicle by driving a propulsion driving wheel via a transmission, and generates electric power by driving the alternator 16. The starter motor 18 is, for example, a direct-current electric motor, and produces a rotational force by the power supplied from the secondary battery 14, and starts up the engine 17. The load 19 is, for example, an electric steering motor, a defogger, an ignition coil, a car audio system and a car navigation system or the like, and operates by electric power from the secondary battery 14.

FIG. 2 is a diagram illustrating a detailed exemplary configuration of the control unit 10 shown in FIG. 1. As shown in the figure, the control unit 10 has a CPU (Central Processing Unit) 10a, a ROM (Read Only Memory) 10b, a RAM (Random Access Memory) 10c, a display unit 10d and an I/F (Interface) 10e. The CPU 10a controls each unit based on a program 10ba stored in the ROM 10b. The ROM 10b may be a semiconductor memory or the like and stores the program 10ba, etc. The RAM 10c may be a semiconductor memory or the like and stores a parameter 10ca which is generated when the program 10ba is executed. The display unit 10d may be, for example, a liquid crystal display or the like, that displays information supplied from the CPU 10a. The I/F 10e converts signals supplied from the voltage sensor 11, the current sensor 12 and the temperature sensor 13 into digital signals and takes them in, and also supplies a driving current to the discharging circuit 15 and controls it.

(B) Description of Operation Principle of Embodiment

An operation principle of an embodiment will be described with reference to FIGS. 3 to 5. In the present embodiment, while the engine 17 is being stopped and the secondary battery 14 is in an electrical equilibrium state (a state where substantially almost no discharging and charging are performed), the secondary battery 14 is repeatedly discharged by the discharge circuit 15 in a predetermined cycle, and a static internal resistance (an internal resistance when the secondary battery 14 is in an equilibrium state) of the secondary battery 14 is calculated from the voltage and the current. When starting up the engine 17, a dynamic internal resistance (an internal resistance when the secondary battery 14 is in a discharging state) is measured from the current and the voltage of the secondary battery 14. The dynamic internal resistance and the static internal resistance that are measured at timings close to each other have a high correlation between each other. FIG. 3 is a diagram showing a relationship between the dynamic internal resistance and the static internal resistance. In FIG. 3, a horizontal axis represents the static internal resistance and a vertical axis represents the dynamic internal resistance. A diamond shape indicates an average value of the dynamic internal resistances in a first half of a period in which the starter motor 18 is rotating (e.g., between rotation start and 0.3 seconds), a square indicates an average value of the dynamic internal resistances for the entire period (e.g., between rotation start to 0.6 seconds), and a triangle indicates an average value of the dynamic internal resistances in a second half (e.g., between 0.3 seconds and 0.6 seconds). As shown in FIG. 3, a high correlation exists between the dynamic internal resistance and the static internal resistance. In other words, FIG. 3 shows that when the dynamic internal resistance increases due changes in a charged state and an environment, the static internal resistance also increases, and when the dynamic internal resistance decreases, the static internal resistance also decreases.

Thus, according to the present embodiment, a dynamic internal resistance at an engine start-up in the past is corrected by a ratio between a static internal resistance before or after the dynamic internal resistance and the static internal resistance within a predetermined time since the current point of time, and determining the possibility of the start-up based on a magnitude thereof. Accordingly, even if time has elapsed since the start-up in the past or the environment has changed, the possibility of start-up can be determined accurately.

This will be described in detail below. FIG. 4 is a diagram showing a temporal variation in a terminal voltage of the secondary battery 14. In FIG. 4, a horizontal axis represents time and a vertical axis represents the terminal voltage of the secondary battery 14. In the example of FIG. 4, a static internal resistance Z1 is measured at time t1, and, in a period between time tc1 and tc2, a crank shaft of the engine 17 performs cranking (rotational drive) by the starter motor 18, and a dynamic internal resistance Zc1 during this period is measured. After the vehicle has run with the engine 17 being started-up, the engine 17 is stopped and a static internal resistance is measured at a constant interval. For example, at time t2, which is the time at which the engine 17 is in a stopped state, the control unit 10 measures a static internal resistance Z2. Then, based on the following equation (1), the control unit 10 estimates a dynamic internal resistance Zc2 for a case where cranking is performed between time tc2 and time tc3.

$$Zc2 = Zc1 \times Z2/Z1 \qquad (1)$$

By using the above equation (1), Zc2 can be estimated accurately even if time has elapsed since the past cranking or the environment has changed.

After having obtained Zc2, the control unit 10 determines whether or not Zc2 is greater than a threshold Zcth, and in a case where it is greater, it is determined that the start-up of the engine 17 is difficult, and a warning is issued.

FIG. 5 is a flowchart for explaining an outline of the operation of the present embodiment. The operation of the present embodiment will be described in further detail with reference to FIG. 5. When a process of the flow chart of FIG. 5 is started, the following steps are performed.

In step S1, the control unit 10 repeats periodically electric discharging in a pulsed manner for a predetermined times by the discharge circuit 15 and detects a voltage and a current at that time with the voltage sensor 11 and the current sensor 12 to calculate the static internal resistance Z2 from these values. The value of the static internal resistance is not limited to the value calculated at such a time point only, and may be a static internal resistance measured within a predetermined period of time (e.g., within several minutes to several hours). This is because, when the secondary battery 14 is in an equilibrium state, the static internal resistance does not change greatly within a short time. In a case where the current flowing from the secondary battery 14 to the load 19 is large, the static internal resistance may be limited those within several minutes only.

In step S2, the control unit 10 obtains the static internal resistance Z1 that has been measured before the cranking in the past and stored as the parameter 10ca in the RAM 10c. The cranking in the past may be the latest cranking or may be the cranking preceding the latest cranking.

In step S3, the control unit 10 obtains the dynamic internal resistance Zc1 that has been measured during the cranking in the past and stored as the parameter 10ca in the RAM 10c. The cranking in the past may be the latest cranking or the cranking preceding the latest cranking as long as it is close to the time of measurement of the static internal resistance.

In step S4, the control unit 10 estimates Zc2 during the next cranking based on the aforementioned equation (1).

In step S5, the control unit 10 performs a determination of whether the dynamic internal resistance Zc2 estimated in step S4 is greater than threshold Zcth, and when it is determined to be greater, proceeds to step S6, and when it is not greater, terminates the process.

In step S6, the control unit 10 issues a warning to warn that it is difficult to start up the engine 17. For example, the control unit 10 issues a warning to the user by presenting a message such as "Difficult to start-up engine" on the display unit 10d.

As has been described above, according to the present embodiment, since the dynamic internal resistance Zc2 of the next cranking is estimated based on a product of the ratio (Z2/Z1) between the static internal resistance Z2 measured in a predetermined period of time and the static internal resistance Z1 before the cranking in the past and the dynamic internal resistance Zc1 in the cranking in the past, and a possibility of the start-up at the time of the next cranking is determined based on a comparison between the dynamic internal resistance Zc2 and the threshold Zcth, the possibility of the start-up can be determined accurately even in a case where time has elapsed since the start-up in the past or in a case where the environment has changed.

Note that, in the above description, the environmental temperature was not taken into consideration, but, for example, when calculating the static internal resistance and the dynamic internal resistance, correction by temperature may be performed on the calculated static internal resistance and dynamic internal resistance based on the output from the temperature sensor 13. Specifically, a table or a conversion equation for converting these internal resistances into internal resistances at a reference temperature or internal resistances at a temperature at the time of determination may be stored in the ROM 10b, and these internal resistances may be converted into internal resistances at the reference temperature or the temperature at the time of determination in accordance with the table or the conversion equation.

(C) Explanation of Detailed Operation of the Embodiment

Figure 6:
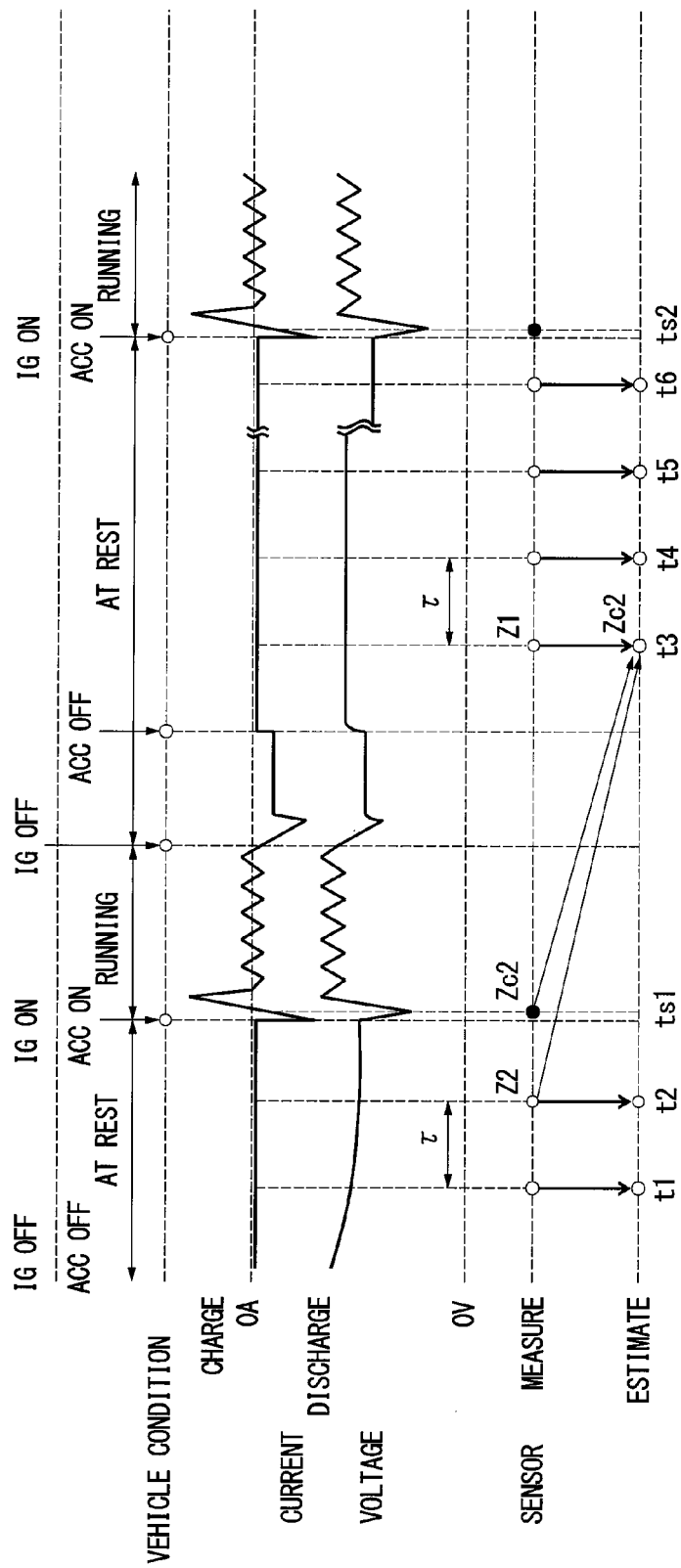
[FIG. 6]

The detailed operation of the present embodiment will now be described. FIG. 6 is a diagram showing a relationship between a vehicle state and changes in voltage and current. As shown in FIG. 6, when an ignition key for starting the engine 17 is brought to an IG (Ignition) ON position and the starter motor 18 starts the cranking of the engine 17, a voltage and a current are measured, and a dynamic internal resistance is calculated. When the ignition key is brought to an ACC (Accessory) OFF position and the vehicle comes to a stopped state, the static internal resistance is measured at a cycle of τ. Further, an amount of voltage drop at the next cranking is obtained based on a static internal resistance measured before a cranking in the past, a static internal resistance measured this time, and a dynamic internal resistance measured at the time of the cranking in the past, and a warning is issued when an amount of voltage drop exceeds a predetermined threshold.

Figure 7:
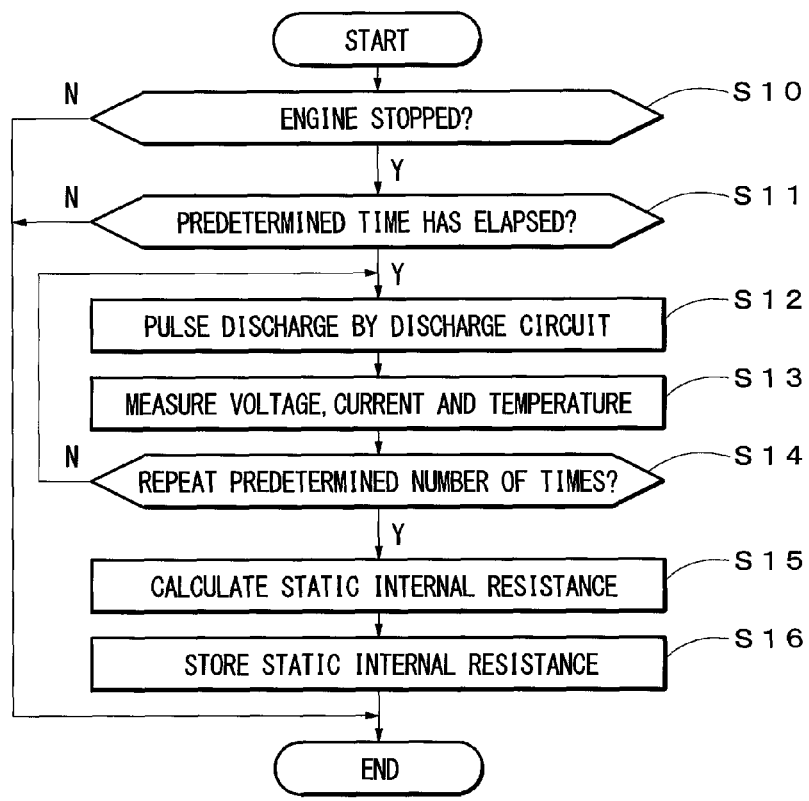
[FIG. 7]

FIG. 7 is a flowchart showing an exemplary process of obtaining a static internal resistance which is performed at time t1, etc., in FIG. 6. When a process of this flowchart is started, the following steps are executed.

In step S10, the CPU 10a of the control unit 10 performs the determination of whether or not the engine 17 is stopped, and when it is stopped (step S10: Yes), it advances to step S11, and when it is not stopped (step S10: No), terminates the process. Note that, in a method of determining whether the engine 17 is stopped, the determination may be, for example, performed based on whether the ignition key is brought to an OFF position.

In step S11, it is determined by the CPU 10a whether a predetermined time (in the example of FIG. 6, τ) has elapsed since the previous measurement of the static internal resistance, and when a predetermined time has elapsed (step S11: Yes), the process proceeds to step S12 and when a predetermined time has not elapsed (step S11: No), the process terminates.

In step S12, the CPU 10a controls the discharge circuit 15 and causes the secondary battery 14 to discharge a single pulsed electric current.

In step S13, the CPU 10a refers to outputs from the voltage sensor 11, the current sensor 12 and the temperature sensor 13, and the voltage, current and temperature of the secondary battery 14 are detected.

In step S14, the CPU 10a performs determination of whether the process has been repeated for a predetermined number of times, and, when it has been repeated for a predetermined number of times (step S14: Yes), the process proceeds to step S15, and when it has not been repeated (step S14: No), the process returns to step S12 and repeats a similar process. Note that, by repeating the process of steps S12 to S14, the voltage, current and temperature are measured, for example, several times at a cycle of, for example, 0.02 to 0.03 seconds. Note that the result of a measurement is stored in the RAM 10c.

In step S15, the CPU 10a calculates the static internal resistance based on the voltage and the current measured in step S13. Specifically, the static internal resistance of the secondary battery 14 is calculated by performing a Fourier expansion on an electric current pulse and a response voltage, respectively.

In step S16, the CPU 10a causes the static internal resistance which was calculated in step S15 to be stored into the RAM 10c as a parameter 10ca, and terminates the process.

With the process described above, the static internal resistance can be obtained at a predetermined cycle and stored in the RAM 10c.

Figure 8:
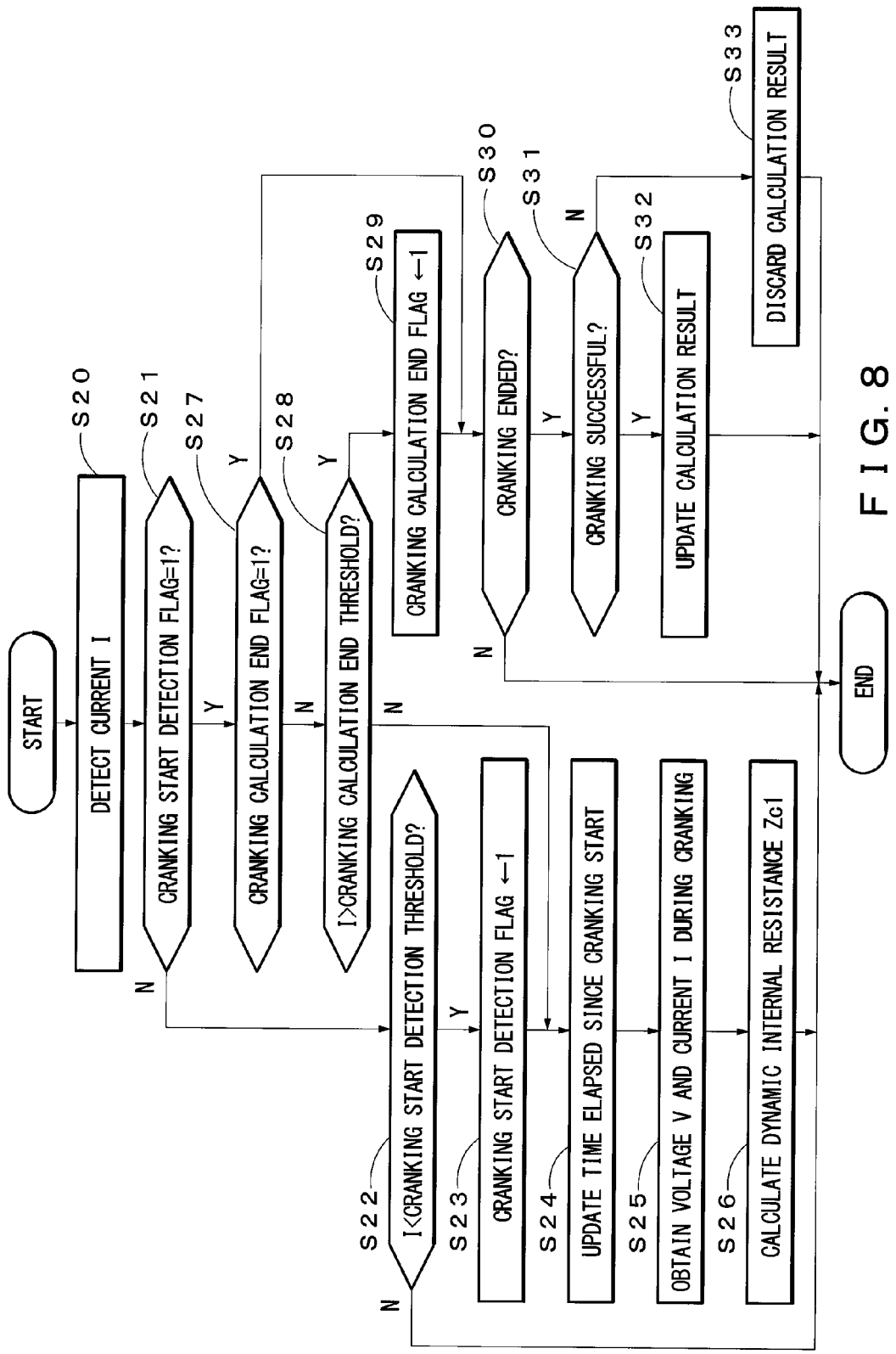
[FIG. 8]

Referring now to FIG. 8, a process of obtaining the dynamic internal resistance will be described. The process shown in FIG. 8 is repeatedly performed at a predetermined cycle. When the process of FIG. 8 is started, the following steps are executed.

In step S20, the CPU 10a refers to the output of the current sensor 12, and the current I flowing to the secondary battery 14 is detected.

In step S21, the CPU 10a performs determination of whether or not a cranking start detection flag, which is set to "1" when it is detected that the cranking has started, is "1", and when it is "1" (step S21: Yes), the process proceeds to step S27, and when it is not detected (step S21: No), the process proceeds to step S22. The cranking start detection flag is a flag which is set to "1" in step S23 when it is determined that the cranking has been started in step S22, and which is set to a value "0" when it is not determined that the cranking has been started.

Figure 9:
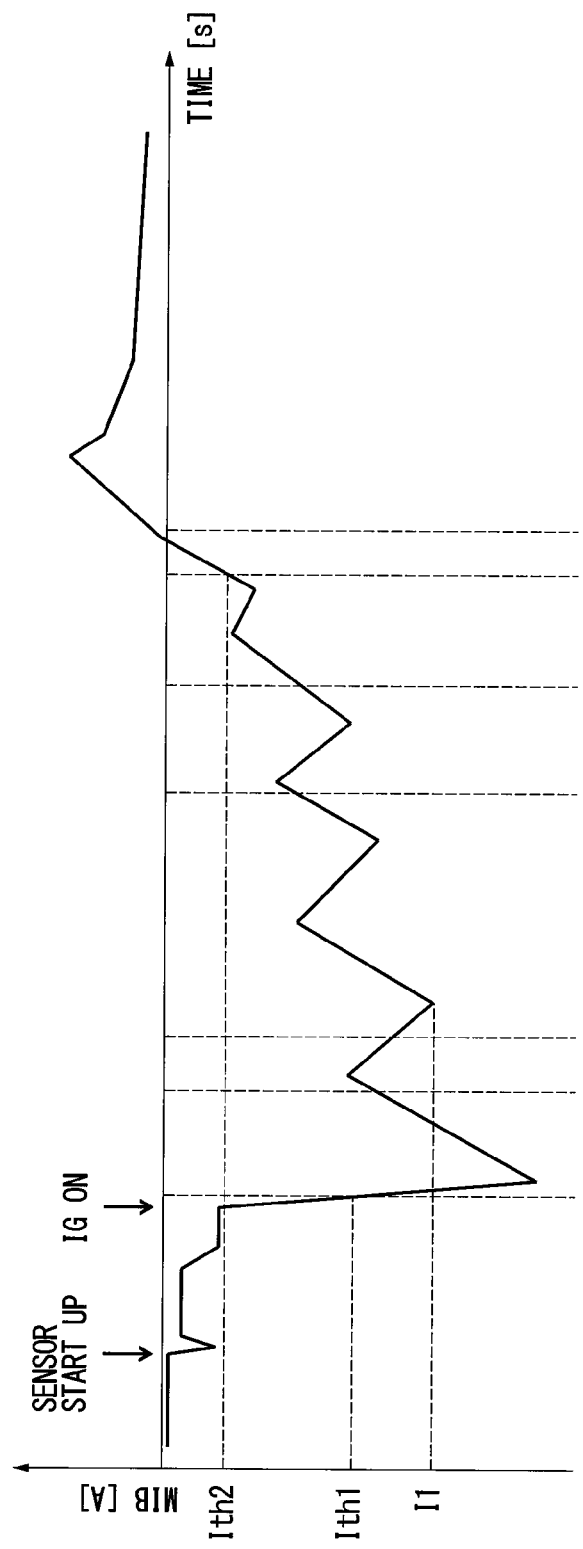
[FIG. 9]

In step S22, the CPU 10a performs a determination of whether or not the current I detected in step S20 is smaller than a cranking start detection threshold for determining the cranking start, and when it is smaller (step S22: Yes) the process proceeds to step S23, and when it is not smaller (step S22: No), the process is terminated. FIG. 9 is a diagram showing a temporal change in the current flowing to the secondary battery 14 at the time of the cranking. As shown in FIG. 9, when the ignition is turned on (IG ON), and cranking by the starter motor 18 is started, an electric current begins to flow suddenly, and then the current decreases as the number of rotations of the starter motor 18 increases, and the engine 17 starts up. When the engine 17 starts up, since the charging by the alternator 16 is started, the electric current becomes positive. In the process of step S22, when the current I detected in step S20 has become less than or equal to Ith1, which is a cranking start detection threshold, it is determined to be Yes, and the process proceed to step S23.

In step S23, the CPU 10a sets the cranking start detection flag to "1". Thereafter, it is determined as Yes in step S21.

In step S24, the CPU 10a updates time elapsed since the cranking start. Specifically, the time elapsed since the detection of the cranking start in step S22 is updated.

In step S25, the CPU 10a obtains the voltage and the current during the cranking from the voltage sensor 11 and the current sensor 12. Note that, as has been described above, since the process of FIG. 8 is performed at a predetermined cycle, the voltage and the current during the cranking are obtained at a predetermined cycle.

In step S26, the CPU 10a calculates a dynamic internal resistance Zc1 based on the voltage and the current obtained in step S25. Specifically, the CPU 10a calculates the dynamic internal resistance Zc1 based on the following equation (2).

Note that calculated dynamic internal resistance Zc1 is stored in the RAM 10c as a parameter 10ca.

$$Zc2=(Vr-Vs)/(Ir-Is) \qquad (2)$$

Here, Vr is a voltage of the secondary battery 14 before the cranking start, and Vs is a voltage which is newly measured in step S25. Ir is an electric current of the secondary battery 14 before the cranking start, and Is is an electric current which is newly measured in step S25. Note that, instead of the voltage of the secondary battery 14 before the cranking start, a stable open circuit voltage OCV (Open Circuit Voltage) or an estimated value of the stable open circuit voltage OCV may be used.

In step S27, the CPU 10a performs a determination of whether or not a cranking calculation end flag indicating that a calculation of the dynamic internal resistance has been finished during the cranking is "1", and when it is "1" (step S27: Yes), the process proceeds to step S30, and when it is not "1" (step S27: No), the process proceeds to step S28. Here, the cranking calculation end flag is a flag which is set to "1" in step S29, in a case where the electric current has become greater than the cranking calculation end threshold in step S28.

In step S28, the CPU 10a performs a determination of whether the electric current I detected in step S20 is greater than the cranking calculation end threshold. When it is greater (step S28: Yes), the process proceeds to step S29, and when it is not greater (step S28: No), the process proceeds to step S24 and a process similar to that of the aforementioned case is performed. Specifically, Ith2 shown in FIG. 9 is taken as a cranking calculation end threshold and the determination is performed by comparison with Ith2.

In step S29, the CPU 10a sets the cranking calculation end flag to "1". As a result, after this, it is determined to be Yes in step S27.

In step S30, the CPU 10a performs a determination of whether or not cranking has been finished, and, when it has been finished (step S30: Yes), the process proceeds to step S31, and when it has not been finished (step S30: No), the process is terminated. Specifically, the CPU 10a can determine that the cranking has terminated, in a case where the ignition key has been brought back to an IG ON position from the position for rotating the starter motor 18.

In step S31, the CPU 10a performs a determination of whether or not the cranking was successful, and, when it was successful (step S31: Yes), the process proceeds to step S32, and when it is was not successful (step S31: No), it proceeds to step S33. Specifically, in a case where the cranking time is greater than or equal to a predetermined threshold and the alternator 16 has started operating, the CPU 10a determines that the cranking was successful and can proceed to step S32.

In step S32, since the cranking was a successful, the CPU 10a updates the calculation result. Specifically, the dynamic internal resistance Zc1 calculated in step S26 is taken as a new dynamic internal resistance, and the dynamic internal resistance Zc1 calculated in the latest cranking is taken as the dynamic internal resistance Zc2.

In step S33, since the cranking has failed, the CPU 10a discards the calculation result. Specifically, the dynamic internal resistance Zc1 calculated in step S26 is discarded.

With the aforementioned process, the dynamic internal resistance can be obtained from the voltage and the current of the secondary battery 14 during the cranking. Note that, according to the process of FIG. 8, a plurality of dynamic internal resistances during the cranking can be obtained. However, as the dynamic internal resistance used in a process of FIG. 10 to be described below, for example, an average dynamic internal resistance for a predetermined period, a dynamic internal resistance after a predetermined time has elapsed since the cranking start, and the largest value among a plurality of measured values may be used.

Figure 10:
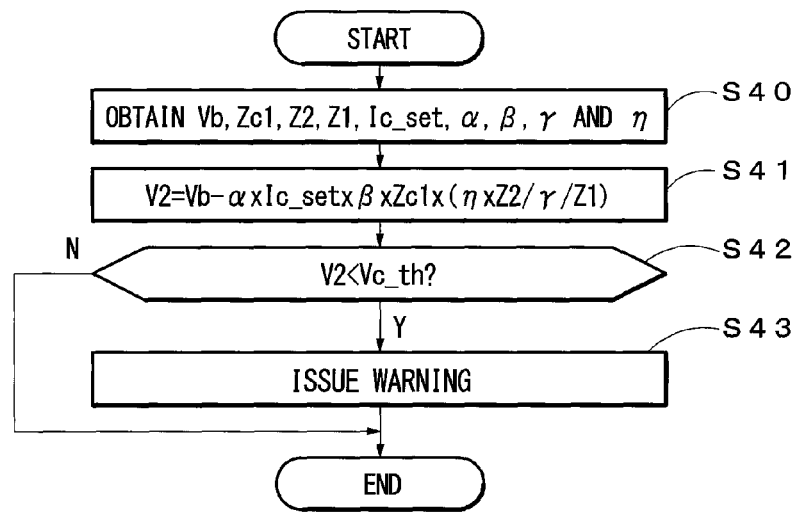
[FIG. 10]

Next, a process of determining the start-up possibility of the engine 17 will be described with reference to FIG. 10. The process of FIG. 10 is performed, for example, in a case where a static internal resistance is newly measured, in a case where an instruction is given by a driver who is a user, or, at a predetermined time interval. Note that the following steps are performed when a process shown in FIG. 10 is started.

Figure 11:
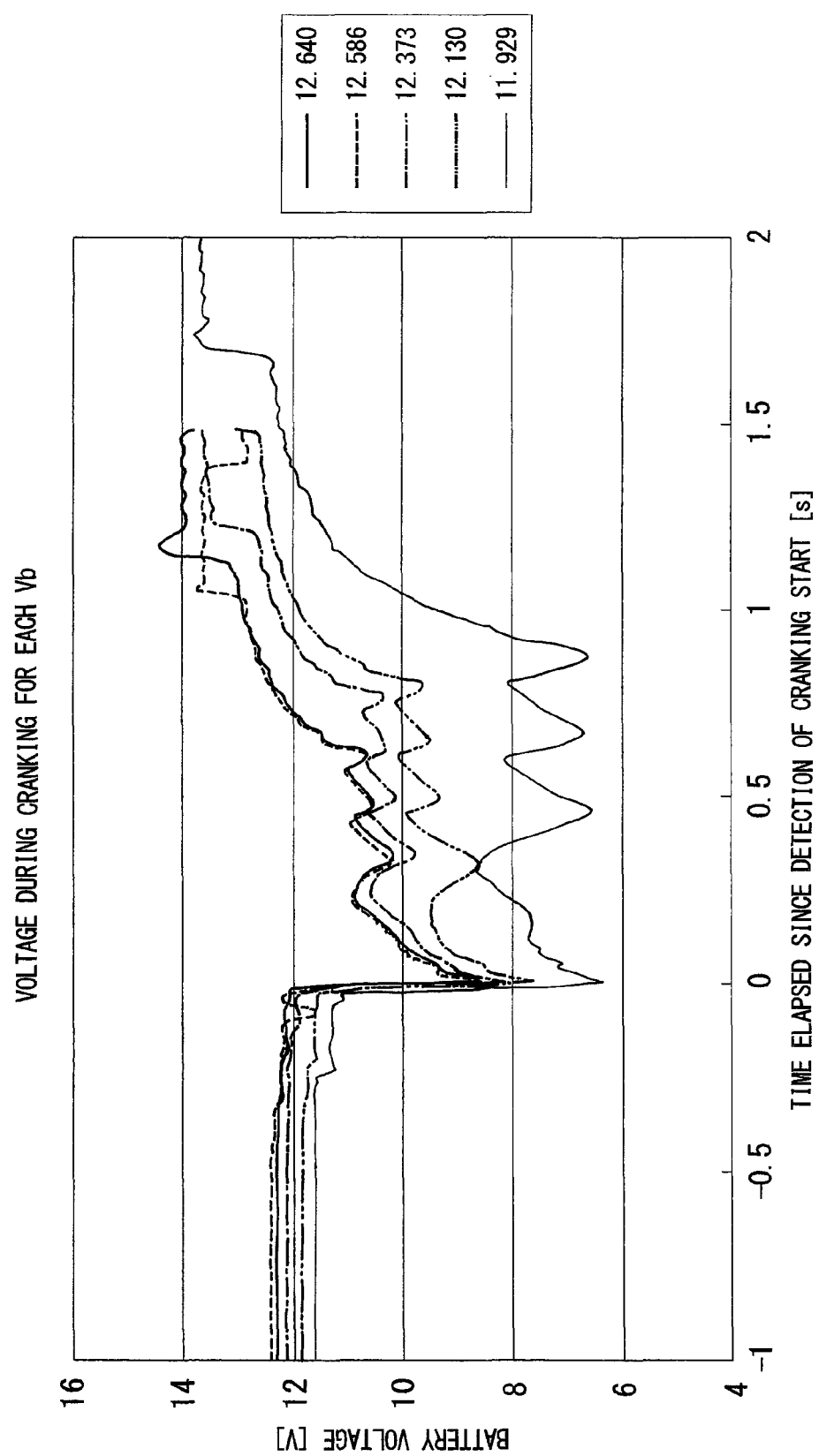
[FIG. 11]

In step S40, the CPU 10*a* obtains parameters below from the RAM 10*c*. "Vb" represents a voltage of the secondary battery 14 immediately before cranking. FIG. 11 is a diagram showing a voltage variation of the secondary battery 14 during cranking for each Vb. As shown in FIG. 11, when the voltage Vb of the secondary battery 14 immediately before the cranking is high, the voltage drop during the cranking is small, and, when voltage Vb is low, the voltage drop during the cranking becomes greater. Therefore, in the present embodiment, the possibility of start-up is determined in accordance with a mathematical expression including voltage Vb.

Returning to FIG. 10, Zc1 is a dynamic internal resistance measured at the time of the latest cranking. Z2 is a static internal resistance that is measured before the latest cranking (e.g., immediately before cranking). Z1 is a static internal resistance measured after the last cranking (e.g., this time). Ic_set is a value obtained by correcting the current at the time of the cranking which is set in advance (fixed value) with Vb. In other words, when Vb has increased, Ic_set may be set to a greater value in response to the increase in Vb, and when Vb has decreased, Ic_set may be set to a smaller value in response to the decrease in Vb. Further, $\alpha$, $\beta$, $\gamma$ and $\eta$ are parameters for temperature correction. Specifically, $\alpha$, $\beta$, $\gamma$ and $\eta$ are parameters for correcting differences, if any, between one of a temperature setting of Ic_set, a temperature at the time of measurement of Zc1 (at the time of the latest cranking), and a temperature at the time of measurement of Z1 (before the latest cranking), and the temperature at the current point of time.

In step S41, the CPU 10*a* estimates the voltage V2 at the time of the next cranking in accordance with the following equation (3).

$$V2 = Vb - \alpha \cdot \text{Ic\_set} \times \beta \cdot Zc1 \times \left(\frac{\eta \cdot Z2}{\gamma \cdot Z1}\right) \quad (3)$$

In the equation, the ratio between Z2 and Z1 is shown in the brackets on the right hand side. When there is no change in the state or no change in the environment for the secondary battery 14 between the latest measurement and the measurement of this time, the ratio is "1", and when there is a change, the ratio is a predetermined value that corresponds to the change. Therefore, by multiplying the ratio by the dynamic internal resistance Z1 at the latest cranking, the dynamic internal resistance Zc1 is corrected in accordance with the change of state or the change of environment, and obtains a value corresponding to the dynamic internal resistance Zc2 at the time of the next cranking. Then, a value corresponding to the dynamic internal resistance Zc2 thus-obtained at the time of the next cranking is multiplied by the current Ic_set at the time of the cranking to obtain a voltage drop based on the dynamic internal resistance Zc2, and the voltage drop is subtracted from the voltage Vb to obtain the estimated voltage V2 at the time of the next cranking.

In step S42, the CPU 10*a* compares the voltage V2 at the time of the next cranking which is calculated in step S41 with the threshold Vc_th. When it is V2<Vc_th (step S42: Yes), the process proceeds to step S43, and when it is not V2<Vc_th, the process is terminated. In other words, when the estimated voltage V2 at the time of the next cranking is smaller than the predetermined threshold Vc_th, it is assumed that the cranking cannot be performed smoothly and the engine 17 cannot be started up, and in such a case, the process proceeds to step S43. Note that, for example, for specific value of Vc_th, in the case of a reciprocating engine which uses gasoline as a fuel, 7V can be used. In the case of a diesel engine, since an electric current which is greater than that of the reciprocating engine using gasoline by about 50 percent flows and a voltage drop is also large, it is desirable to set the electric current to a value greater than 7V (e.g., 9V).

In step S43, the CPU 10*a* causes the display unit 10*d* to display thereon a warning indicating that there is a possibility that the engine 17 cannot be started. Instead of displaying the warning on the display unit 10*d*, the ECU (Engine Control Unit), not shown, which controls the engine 17, may be notified of the fact that there is a possibility that the engine 17 cannot be started.

In the aforementioned process, since the voltage V2 of the secondary battery 14 during the next cranking is estimated based on equation (3) and, when V2 is smaller than the predetermined threshold Vc_th, it is determined that the start-up of engine 17 is difficult and a warning is issued, even if there is a change in the condition since the latest cranking, the determination can be performed accurately.

Figure 12A:
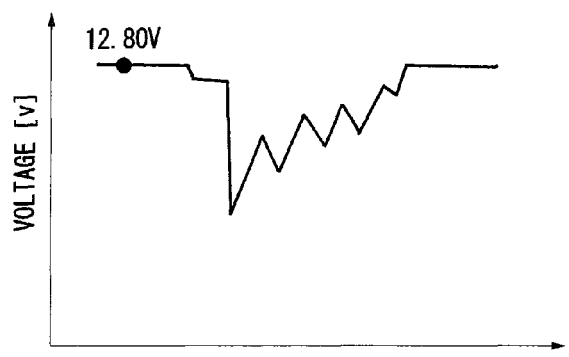
FIGS. 12A to 12C are diagrams showing a temporal change in a voltage, electric current and a dynamic internal resistance during cranking.

FIGS. 12A to 14C are diagrams showing a prediction result of voltage V2 according to the present embodiment. Firstly, FIGS. 12A to 12C are diagrams showing a measurement result for a case where the voltage of the secondary battery 14 at the time of measurement of the static internal resistance Z2 is 12.80V. FIG. 12A is a diagram showing a change in voltage during the cranking when the voltage of the secondary battery 14 at the time of measurement of the static internal resistance Z2 is 12.80 V. FIG. 12B is a diagram showing a change in electric current during the cranking and a change in dynamic internal resistance. Note that, in the drawings, a solid line, a broken line and a dash-dot line show changes in dynamic internal resistance for cases where the voltage of the secondary battery 14 at 0.01 seconds, 0.02 seconds, and 0.6 seconds prior to the detection of an inrush current of the cranking, respectively are taken as a reference voltage (Vr in Equation (2)), respectively. Further, FIG. 12C is a diagram showing changes in the voltage and the current during cranking. In the example of FIGS. 12A to 12C, although not shown in the diagrams, the measured value of the static internal resistance Z2 immediately before is 8.33 [m$\Omega$] and an average value of the dynamic internal resistance between 0.3-0.6 seconds from an inrush current detection of the cranking is 10.48 [m$\Omega$].

Figure 12B:
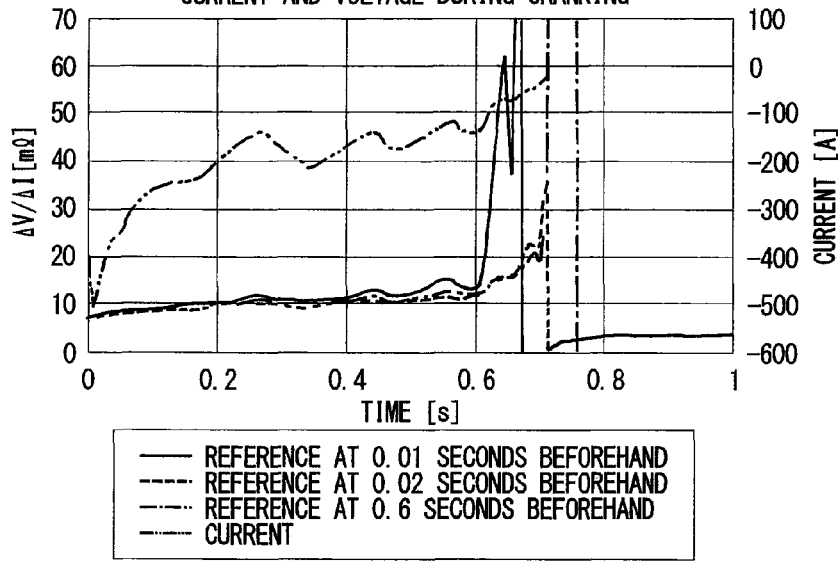
Figure 12C:
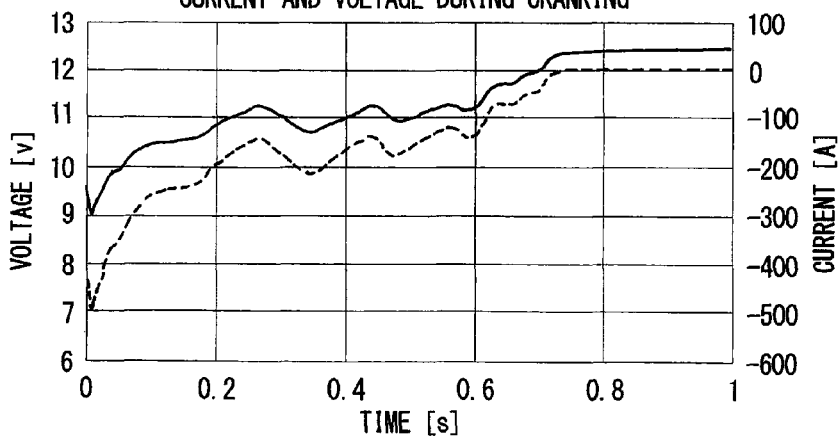
Figure 13A:
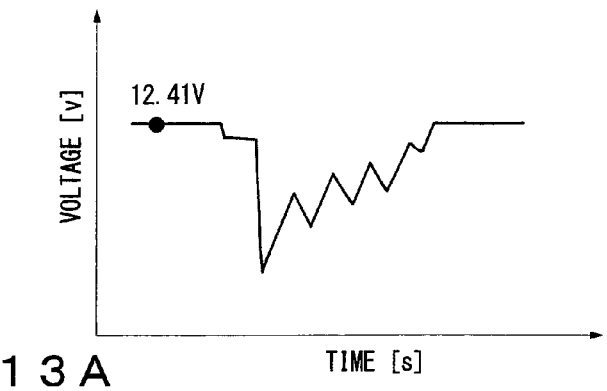
FIGS. 13A to 13C are diagrams showing a temporal change in a voltage, electric current and a dynamic internal resistance during cranking.
Figure 13B:
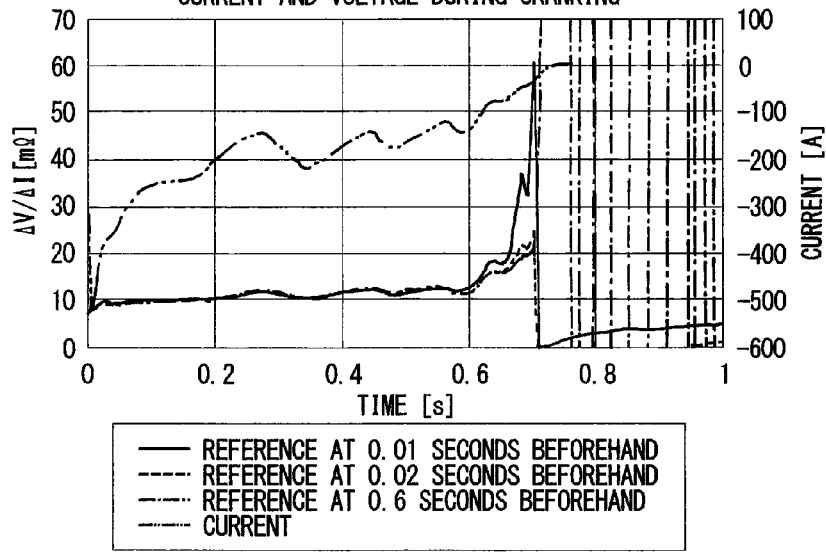
Figure 13C:
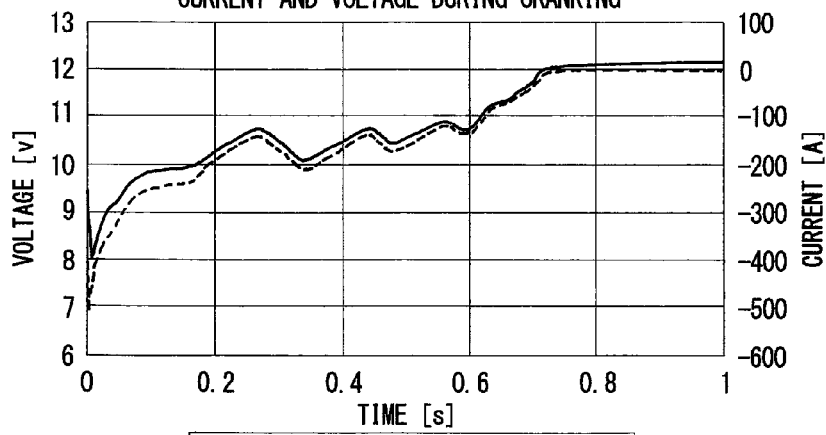

FIGS. 13A to 13C are diagrams showing the results of measurement for a case where there is a 30% decrease of SOC (State of Charge) from the state of FIGS. 12A to 12C, and the voltage of the secondary battery 14 at the time of measurement of the static internal resistance Z2 is 12.41V. FIG. 13A is a diagram showing a change in voltage for a case where the voltage of the secondary battery 14 at the time of measurement of the static internal resistance Z2 is 12.41V, and FIG. 13B is a diagram showing a change in electric current and a change in dynamic internal resistance during the cranking, and FIG. 13C is a diagram showing changes in the voltage and the current during the cranking. In an example of FIGS. 13A to 13C, although not shown in the diagrams, the measured value of the static internal resistance Z2 immediately before is 9.69 [mΩ] and an average value of the dynamic internal resistance between 0.3-0.6 seconds from the inrush current detection of the cranking is 11.48 [mΩ]. When an electric current of 200 A flows, an estimated value of voltage V2 at the time of the cranking in the above-mentioned embodiment is 9.97V, which is a value close to the measured value 10.16V at a point of time when an electric current of 202 A flows.

Figure 14A:
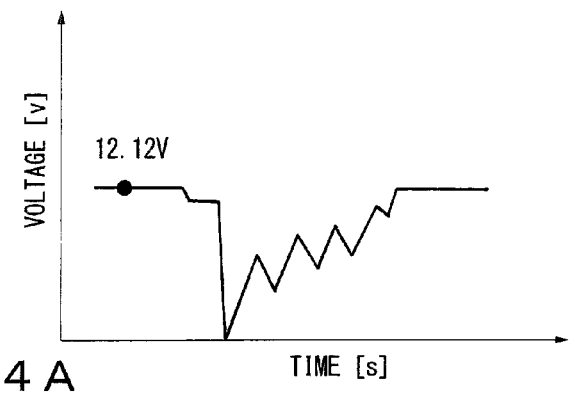
FIGS. 14A to 14C are diagrams showing a temporal change in a voltage, electric current and a dynamic internal resistance during cranking.
Figure 14B:
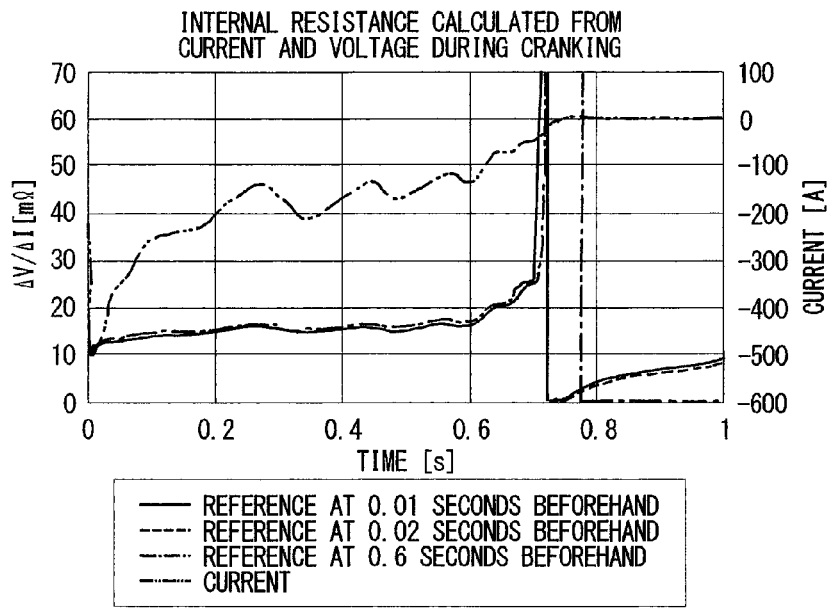
Figure 14C:
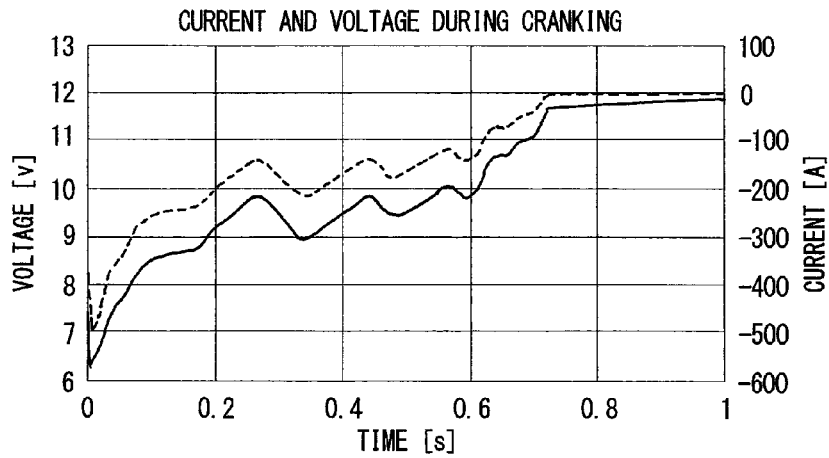

FIGS. 14A to 14C are diagrams showing a result of a measurement for a case in which there is a 30% decrease in the SOC from the state of FIGS. 13A to 13C, and the voltage of the secondary battery 14 at time of measurement of the static internal resistance Z2 is 12.12V. FIG. 14A is diagram showing a change in voltage during the cranking for a case where the voltage of the secondary battery 14 at the time of the measurement of the static internal resistance Z2 is 12.12V, and FIG. 14B is a diagram showing a change in electric current during the cranking and a change in the dynamic internal resistance, and FIG. 14C is a diagram showing a change in voltage and electric current during the cranking. In the example of FIGS. 14A to 14C, although not shown in the diagram, a measured value of static internal resistance Z2 immediately before is 13.46 [mΩ] and an average value of the dynamic internal resistance between 0.3-0.6 seconds from inrush current detection of the cranking is 15.29 [mΩ]. An estimated value of voltage V2 during the cranking in the above-mentioned embodiment at the point of time where an electric current of 200 A flows is 8.93V, which is a value near the measured value 9.07V at the point of time where current of 205 A flows.

Figure 15:
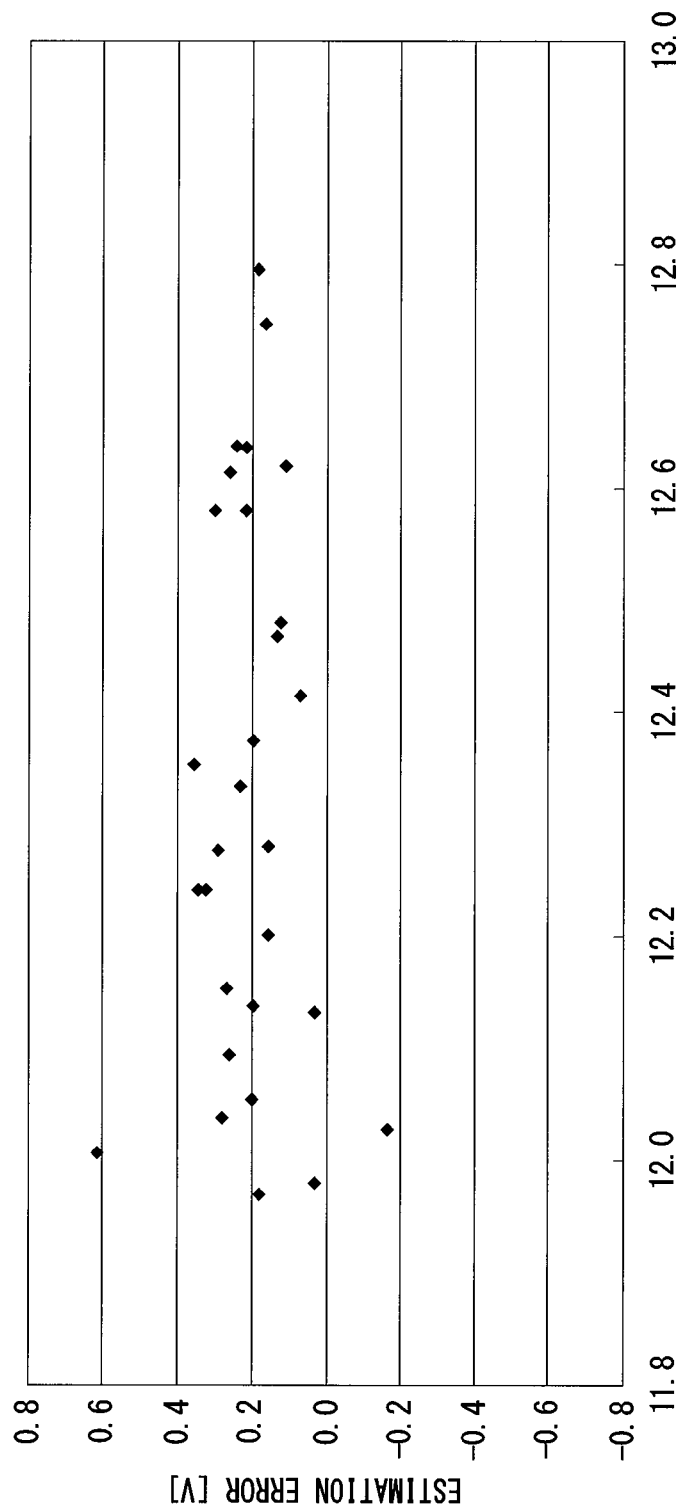
[FIG. 15]
Figure 16:
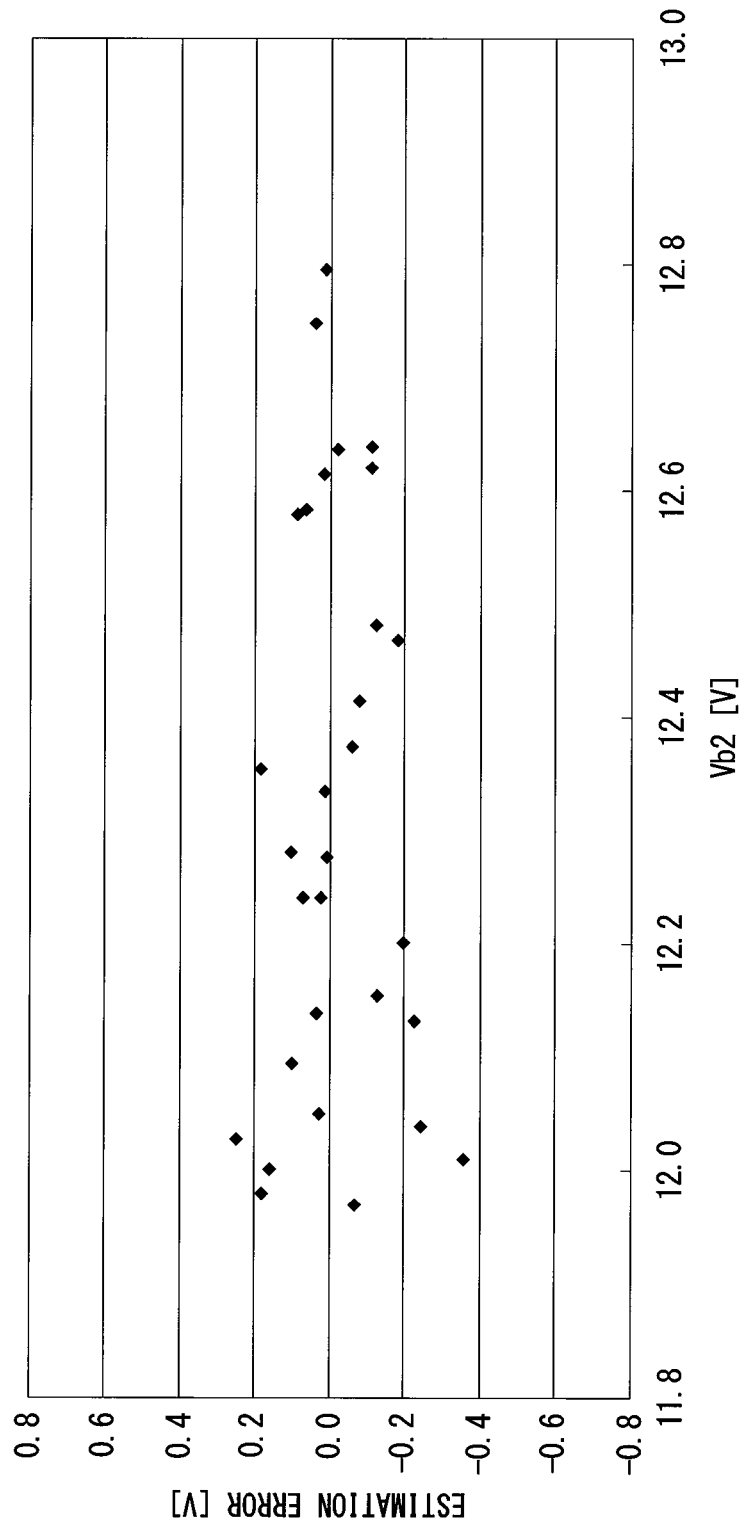
[FIG. 16]
Figure 17:
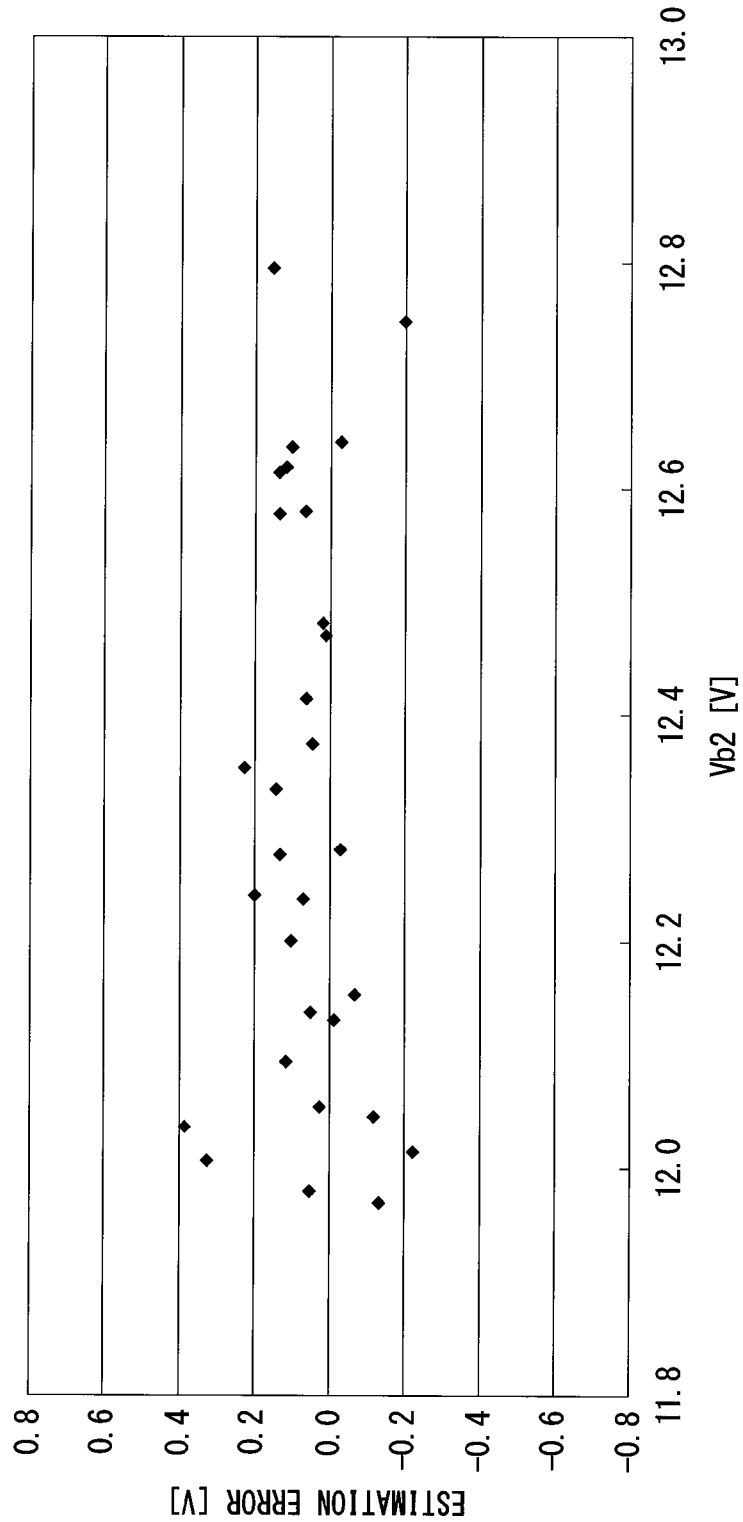
[FIG. 17]

FIGS. 15 to 17 are diagrams showing a voltage estimation result after a predetermined time since the cranking start detection. First, FIG. 15 is a diagram showing the voltage estimated result at 0.2 seconds after the cranking start detection. A horizontal axis indicates voltage Vb of the secondary battery 14 immediately before the cranking, and a vertical axis indicates an estimation error of the voltage. FIGS. 16 and 17 show voltage estimation results at 0.6 seconds and 0.4 seconds after the cranking start detection, respectively. From the comparison between FIGS. 15 to 17, it can be seen that plotted points are concentrated at positions offset from 0.0V in the case of 0.2 seconds afterwards. In the case of 0.4 seconds afterwards, the plotted points are concentrated near 0.0V as compared to the case of 0.2 seconds afterwards. Further, in the case of 0.6 seconds later, the plotted points are concentrated near 0.0V and the dispersion is reduced in comparison to 0.4 seconds later, and the plotted points are concentrated near 0.0V. In other words, in the range of 0.2-0.6 seconds, it can be seen that the estimation error of the voltage decreases at the time near the later half. Therefore, in this range, it is desirable to estimate the voltage for the time near 0.6 seconds. Note that, in a state where start-up is almost impossible or start-up is impossible, a feature indicating that start-up is almost impossible or start-up is impossible appears in the cranking waveform after the cranking inrush current has flowed. Therefore, in order to determine whether start-up is possible or not, it becomes more important to estimate the voltage within a period of time after the inrush, rather than to estimate the voltage at the time of inrush. In the case of a gasoline engine, since it requires about one second for starting up, estimation can be performed at a high accuracy by, for example, estimating the voltage in a period of time of around 0.5 seconds, which is a median.

As has been described above, in the present embodiment, the relationship between the measured values of the dynamic internal resistance and the static internal resistance are used, and the determination of whether the start-up is possible is determined based on this relationship. Therefore, an accurate determination can be performed with a reduced memory capacity without depending on a type of secondary battery 14 or an operating environment. Also, since an accuracy of estimation is high, according to the present embodiment, determination corresponding to various kinds of secondary batteries 14 can be performed and determination adapted to a dynamic load of a vehicle or an apparatus equipped with the secondary battery 14 can be performed.

(D) Description of Variant Embodiments

The aforementioned embodiment is shown by way of example, and the present disclosure is not limited to the embodiment described above. For example, in the aforementioned embodiment, the voltage is estimated using Equation (3), and the start-up possibility of the engine 17 is determined by comparing the estimated voltage with the threshold. However, for example, it is also possible to perform a determination based on a change in the dynamic internal resistance as described in the principle of operation section or the current I2 at the time of cranking based on the following Equation (4) may be obtained and comparing this with the threshold current Ic_th, and when I2<Ic_th, a warning may be issued to inform that the start-up of the engine 17 is difficult.

$$I2 = \frac{V2}{\beta \cdot Zc1 \times \left(\frac{\eta \cdot Z2}{\gamma \cdot Z1}\right)} \quad (4)$$

Also, in the aforementioned embodiment, in order to obtain the voltage prediction value V2 of secondary battery 14, although a case in which Equation (3) is used is described as an example, the following Equation (5) may be used. Here, I1 is an electric current flowing to the secondary battery 14 at the time of the latest cranking, and $\alpha$, $\beta$, $\gamma$ and $\eta$ are temperature correction coefficients. The start-up possibility of the engine 17 can also be determined accurately by using Equation (5). Note that, by using the peak current subsequent to the maximum current in the inrush as I1, as shown in FIG. 9, an accurate determination can be performed.

$$V2 = Vb2 - \alpha \cdot I1 \cdot \beta \cdot Zc1 \frac{\eta \cdot Z2}{\gamma \cdot Z1} \quad (5)$$

Also, in the aforementioned embodiment, the temperature compensation coefficients $\alpha$, $\beta$, $\gamma$ and $\eta$ are used in Equations (3) ... (5). However, depending on an operating environment or a purpose of use, only a part of the coefficients may be used or none of the coefficients may be used.

The control unit 10 shown in FIG. 2 is provided with the display unit 10d. However, the display unit 10d may be omitted and the ECU may be notified of the determination result of the start-up possibility of the engine 17 and the warning may be displayed on the display unit controlled by the ECU.

Also, in the aforementioned embodiment, the possibility of the start-up of the engine 17 is determined based on the dynamic internal resistance Zc1 at the time of the latest engine start, the static internal resistance Z1 immediately before the latest engine start, and the static internal resistance Z2 at the present, but the present disclosure is not limited thereto. For example, the dynamic internal resistance Zc1 may be the one at the engine start-up prior to the last start-up or at an earlier time, and not the one at the start-up of the engine. The static internal resistance Z1 may be, for example, the one several minutes to several hours "beforehand" or the one several minutes to several hours "afterwards", and not the one immediately before the engine start-up. Further, the static internal resistance Z2 may be a measured value of several minutes to several hours "beforehand", and not the latest value.

Also, when measuring the static internal resistance and the dynamic internal resistance, a process of removing an influence of polarization or an influence of discharging/charging current may be performed. Specifically, for example, in order to prevent a decrease in the measurement accuracy of the internal resistance due to an influence of polarization occurring in the secondary battery 14, influences of the polarization can be reduced by measuring an internal resistance after applying a discharging current pulse to the secondary battery 14 when under influence of the charging polarization, and after applying a charging current pulse to the secondary battery 14 when under influence of the discharging polarization. Further, as a method of removing an influence of a discharging/charging current, it is possible to calculate a direct current component from the measured value of the electric current and to estimate the internal resistance at a reference direct current value using an equation expressing the relationship between the direct current and the internal resistance.

In the aforementioned embodiment, only the determination of the start-up possibility is performed. However, for example, based on the determination result of the start-up possibility, for example, it is also possible to control the execution of a so-called idling stop which stops idling of the engine 17. Specifically, the idling stop may be performed when it is determined that the start-up is possible, and the idling stop may be prevented from being performed when it is determined that the start-up is difficult. When it is approaching a state where the start-up is difficult, i.e., when the difference between V2 and Vc_th is becoming smaller, it is for example possible to stop the operation of the load 19 to prevent further consumption of the secondary battery 14.

What is claimed is:

1. A start-up possibility determining apparatus that determines whether an engine can be started up by driving a starter motor by electric power accumulated in a secondary battery, comprising:
    a dynamic internal resistance measuring unit that measures a dynamic internal resistance which is an internal resistance of the secondary battery while the engine is being started up by the starter motor;
    a static internal resistance measuring unit that measures a static internal resistance which is an internal resistance of the secondary battery when the engine is stopped; and
    a determining unit that determines possibility of a start-up of the engine by the secondary battery, based on a value obtained by a product of a ratio between a first static internal resistance which was measured by the static internal resistance measuring unit before or after a time of an engine start-up in the past and a second static internal resistance which was measured by the static internal resistance measuring unit within a predetermined time since a current point of time and the dynamic internal resistance measured by the dynamic internal resistance measuring unit at the time of the engine start-up in the past.

2. The start-up possibility determining apparatus according to claim 1, wherein
    the dynamic internal resistance measuring unit measures the dynamic internal resistance based on a voltage and an electric current of the secondary battery while the engine is being started-up by the starter motor, and
    the static internal resistance measuring unit measures the static internal resistance based on a voltage and an electric current when the secondary battery is caused to intermittently discharge electricity.

3. The start-up possibility determining apparatus according to claim 1, wherein the dynamic internal resistance measuring unit measures the dynamic internal resistance after a predetermined time has elapsed since a start of rotation of the starter motor.

4. The start-up possibility determining apparatus according to claim 1, wherein the determination unit determines the possibility of the start-up of the engine based on a value obtained by correcting values of the dynamic internal resistance and the first static internal resistance in accordance with a temperature at a time of measurement by the dynamic internal resistance measuring unit and the static internal resistance measuring unit.

5. The start-up possibility determining apparatus according to claim 1, wherein the determination unit estimates a voltage and an electric current of the secondary battery at the time of the start-up of the engine based on a value obtained by a product of a ratio between the first and second static internal resistances and the dynamic internal resistance, and determines that the start-up of the engine is possible in a case where one of the estimated voltage and the estimated electric current is greater than the predetermined threshold.

6. The start-up possibility determining apparatus according to claim 1, wherein the determination unit determines that the start-up is possible when a voltage prediction value V2 of the secondary battery at a time of an engine start-up, which is expressed by the following equation, is greater than a predetermined threshold, $$V2 = Vb2 - I1 \cdot Zc1 \frac{Z2}{Z1}$$

where,
Vb2 is a voltage of the secondary battery before an engine start-up or a stable open circuit voltage;
I1 is an electric current flowing to the secondary battery at the time of the engine start-up in the past;
Zc1 is the dynamic internal resistance; and
Z1 and Z2 are the first and the second static internal resistances, respectively.

7. The start-up possibility determining apparatus according to claim 1, wherein the determination unit determines that the start-up is possible when a voltage prediction value V2 of the secondary battery at a time of an engine start-up, which is expressed by the following equation, is greater than a predetermined threshold, $$V2 = Vb2 - \alpha \cdot I1 \cdot \beta \cdot Zc1 \frac{\eta \cdot Z2}{\gamma \cdot Z1}$$

where,
Vb2 is a voltage of the secondary battery before an engine start-up or a stable open circuit voltage;
I1 is an electric current flowing to the secondary battery at the time of the engine start-up in the past;
Zc1 is the dynamic internal resistance;
Z1 and Z2 are the first and the second static internal resistances, respectively; and
α, β, γ and η are temperature correction coefficients.

8. The start-up possibility determining apparatus according to claim 1, wherein the determination unit determines that the start-up is possible when a voltage prediction value V2 of the secondary battery at a time of an engine start-up, which is expressed by the following equation, is greater than a predetermined threshold, $$V2 = Vb2 - Iset \cdot Zc1 \frac{Z2}{Z1}$$

where,

Vb2 is a voltage of the secondary battery before an engine start-up or a stable open circuit voltage;

Iset is a predetermined electric current which is determined in advance;

Zc1 is the dynamic internal resistance; and

Z1 and Z2 are the first and the second static internal resistances, respectively.

9. The start-up possibility determining apparatus according to claim 1, wherein the determination unit determines that the start-up is possible when a voltage prediction value V2 of the secondary battery at a time of an engine start-up, which is expressed by the following equation, is greater than a predetermined threshold, $$V2 = Vb2 - \alpha \cdot Iset \cdot \beta \cdot Zc1 \frac{\eta \cdot Z2}{\gamma \cdot Z1}$$

where,

Vb2 is a voltage of the secondary battery before an engine start-up or a stable open circuit voltage;

Iset is a predetermined electric current which is determined in advance;

Zc1 is the dynamic internal resistance;

Z1 and Z2 are the first and the second static internal resistances, respectively; and $\alpha$, $\beta$, $\gamma$ and $\eta$ are temperature correction coefficients.

10. A start-up possibility determining method of determining whether an engine can be started up by driving a starter motor by electric power accumulated in a secondary battery, the method comprising:

measuring a dynamic internal resistance which is an internal resistance of the secondary battery while the engine is being started up by the starter motor;

measuring a static internal resistance which is an internal resistance of the secondary battery when the engine is stopped; and determining possibility of a start-up of the engine by the secondary battery, based on a value obtained by a product of a ratio between a first static internal resistance which was measured by the static internal resistance measuring unit before or after a time of an engine start-up in the past and a second static internal resistance which was measured by the static internal resistance measuring unit within a predetermined time since a current point of time and the dynamic internal resistance measured by the dynamic internal resistance measuring unit at the time of the engine start-up in the past.

\* \* \* \* \*